United States Patent
Tausch, Jr.

(10) Patent No.: US 12,326,204 B2
(45) Date of Patent: Jun. 10, 2025

(54) HAMMER UNION

(71) Applicant: James Tausch, Jr., Yukon, OK (US)

(72) Inventor: James Tausch, Jr., Yukon, OK (US)

( * ) Notice: Subject to any disclaimer, the term of this patent is extended or adjusted under 35 U.S.C. 154(b) by 0 days.

(21) Appl. No.: 18/652,511

(22) Filed: May 1, 2024

(65) Prior Publication Data

US 2024/0280195 A1  Aug. 22, 2024

Related U.S. Application Data

(63) Continuation of application No. 17/626,726, filed as application No. PCT/US2020/042147 on Jul. 15, 2020, now Pat. No. 12,000,508.

(60) Provisional application No. 62/874,708, filed on Jul. 16, 2019.

(51) Int. Cl.
F16L 19/02 (2006.01)
F16L 19/025 (2006.01)

(52) U.S. Cl.
CPC ......... F16L 19/0218 (2013.01); F16L 19/025 (2013.01)

(58) Field of Classification Search
CPC ..... F16L 19/0218; F16L 19/025; F16L 19/02; F16L 19/0212; F16L 19/0206
See application file for complete search history.

(56) References Cited

U.S. PATENT DOCUMENTS

| | | | |
|---|---|---|---|
| 1,968,562 A | 7/1934 | Lofgren |
| 2,423,771 A | 7/1947 | Gould |
| 2,610,870 A | 9/1952 | Parmesan |
| 2,646,996 A | 7/1953 | Parmesan |
| 2,652,268 A | 9/1953 | Goode |
| 2,780,483 A | 2/1957 | Kessler |
| 2,867,463 A | 1/1959 | Snider |
| 4,836,583 A | 6/1989 | Maier et al. |
| 4,871,180 A | 10/1989 | Preisendorfer |
| 5,280,972 A | 1/1994 | Andersson |
| 6,123,317 A | 9/2000 | Densel et al. |
| 6,220,635 B1 | 4/2001 | Vitel et al. |
| 6,254,147 B1 | 7/2001 | Edwards |
| 6,805,384 B1 | 10/2004 | Wiser |
| 7,063,329 B2 | 6/2006 | Anderson et al. |

(Continued)

FOREIGN PATENT DOCUMENTS

GB  1299354  12/1972

OTHER PUBLICATIONS

International Search Report & Written Opinion mailed in corresponding PCT Application No. PCT/US2020/042147 on Sep. 16, 2020, pp. 1-9.

*Primary Examiner* — David Bochna
(74) *Attorney, Agent, or Firm* — McAfee & Taft, A Professional Corporation

(57) ABSTRACT

A hammer union is provided for reducing and, in most instances, eliminating the likelihood of sealing ring displacement during fluid operations. The hammer union comprises a male pipe member, a union nut placed over the male pipe member, a female pipe member, and a sealing ring. The female pipe member includes a sealing pocket having an arcuate portion, a vertical portion, a base, and a recessed groove. The sealing ring is captured between the male pipe member and the female pipe member such that the sealing ring engages the sealing pocket of the female pipe member at each of the arcuate portion, the vertical portion, the base, and the recessed groove.

18 Claims, 9 Drawing Sheets

(56) References Cited

U.S. PATENT DOCUMENTS

| | | |
|---|---|---|
| 7,717,434 B2 | 5/2010 | Blessing et al. |
| 8,454,058 B2 | 6/2013 | Pechtold et al. |
| 8,814,174 B2 | 8/2014 | Okuda et al. |
| 8,833,804 B2 | 9/2014 | Myers et al. |
| 10,072,776 B2 | 9/2018 | Kocourek |
| 10,107,401 B2 | 10/2018 | Monma et al. |
| 12,000,508 B2 * | 6/2024 | Tausch, Jr. ............ F16L 19/025 |
| 2004/0239116 A1 | 12/2004 | Cooke, Jr. |
| 2008/0136172 A1 | 6/2008 | Roe et al. |
| 2016/0305587 A1 | 10/2016 | Vigre |
| 2016/0377207 A1 | 12/2016 | Witkowski et al. |
| 2020/0124211 A1 | 4/2020 | Morreale |

* cited by examiner

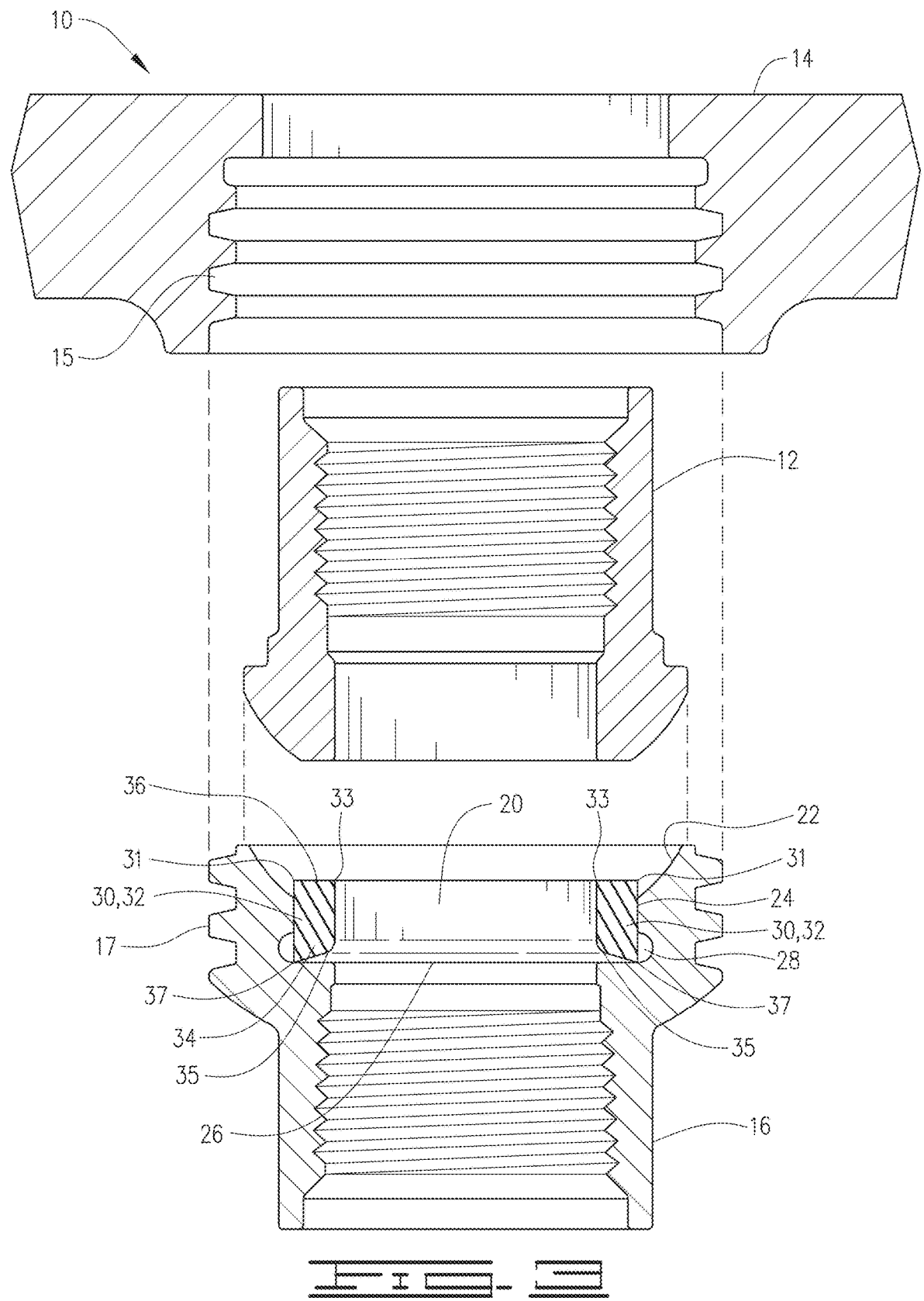

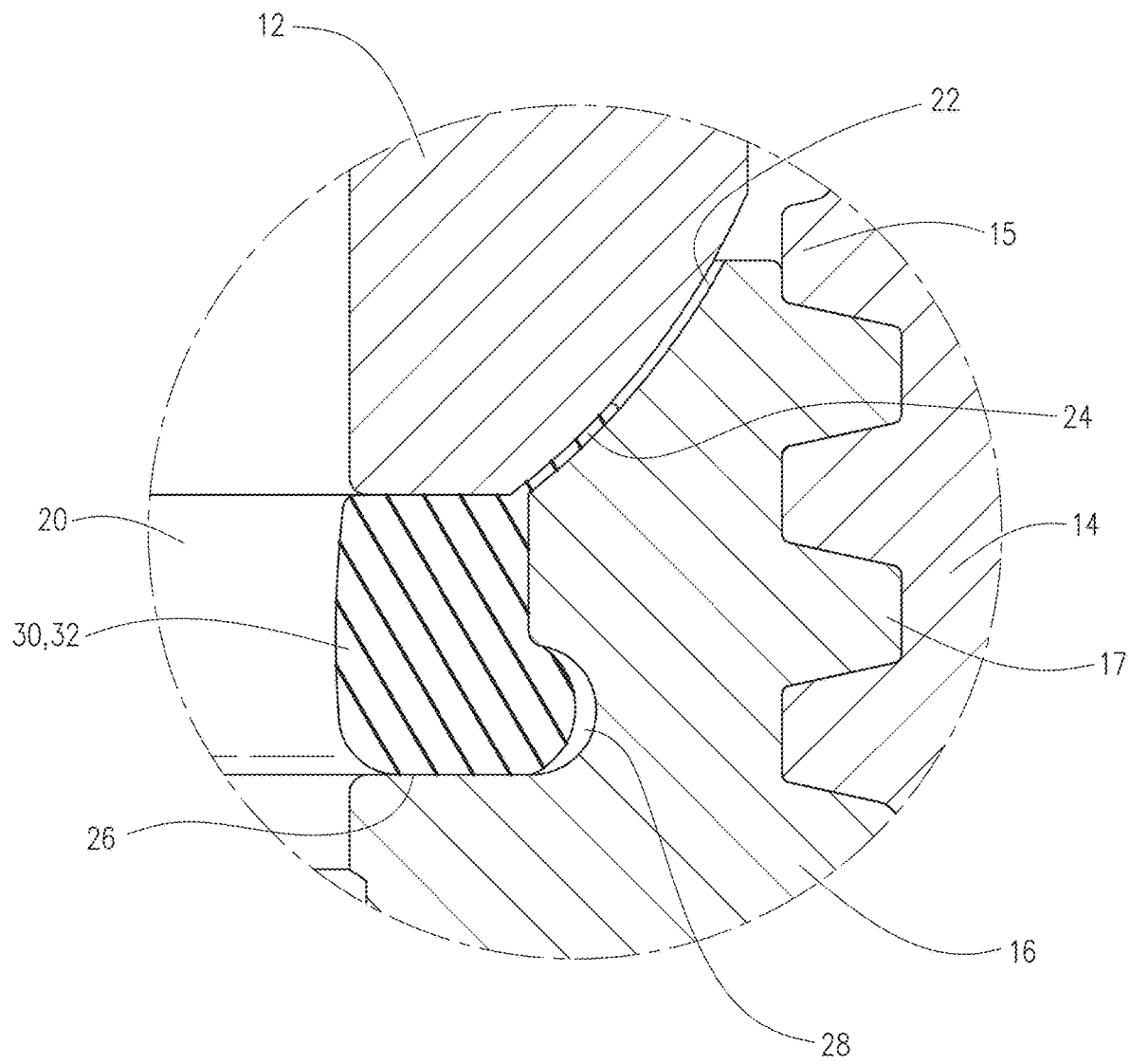

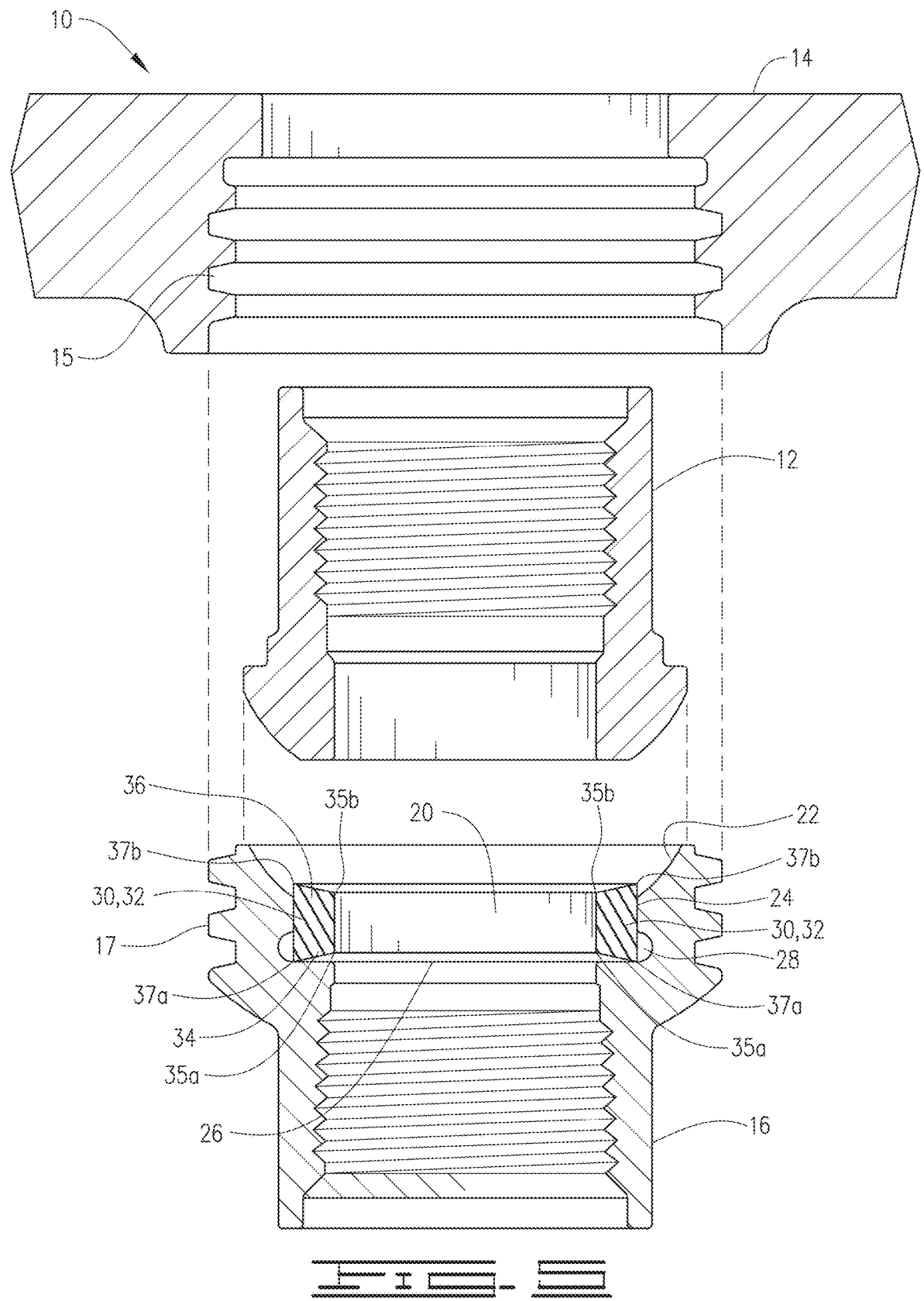

HAMMER UNION

CROSS REFERENCE TO RELATED APPLICATIONS

This application is a continuation of U.S. Non-Provisional application Ser. No. 17/626,726, filed on Jan. 12, 2022, now issued as U.S. Pat. No. 12,000,508 on Jun. 4, 2024, which is a National Stage Entry of International Application No. PCT/US2020/042147, filed on Jul. 15, 2020, which claims the benefit of U.S. Provisional Application No. 62/874,708, filed on Jul. 16, 2019, the entirety of which all are incorporated by reference herein.

TECHNICAL FIELD

The present disclosure relates generally to a hammer union, and, more particularly, to an improved sealing system for sealing the members of a hammer union.

BACKGROUND

In the oil and gas industry, hammer union assemblies are used to join varying conduits. For example, hammer union assemblies join high pressure conduits suitable for conveying fracturing fluids or drilling mud from the downhole environment to the surface. Such high pressure conduit connections must provide extended periods of operation without leaking.

Hammer union assemblies typically include a male member, a threaded union nut, and a threaded female member. During assembly of the hammer union, the threaded union nut slides over the male member and engages the female member. To provide a fluid tight union, the hammer union nut is "hammered" into threadable connection with the threaded female member. A sealing ring is positioned between the male and female members to create an air and water tight seal between the respective members. These seals are typically a soft, flexible rubber or a rigid composite material, and in some cases may include a metal insert.

Current hammer unions frequently suffer from seal failure as the soft, flexible rubber seals may soften when heated by high pressure fluids. Softening of the seal frequently results in displacement of the seal from the union. Use of rigid, composite material seals (especially those including metal inserts) also frequently suffer seal failure as the seals may be damaged during assembly of the threaded union nut to the female member. Seal failure may lead to a portion of the seal jamming into the recessed groove of the female member. In addition, during assembly of the hammer union, both the soft and rigid seals create a 90 degree edge that protrudes into the conduit path. High pressure fluid flow will displace the seal when passing fluid pulls on the protrusion. These deficiencies prompt the need for a hammer union that maintains its air and water tight sealing properties under high pressure fluid flow.

SUMMARY

In accordance with the present invention, a hammer union is provided which overcomes the deficiencies described above, and has other advantages.

In one embodiment, a hammer union is provided. The hammer union comprises a male pipe member, a union nut placed over the male pipe member, a female pipe member, and a sealing ring. The female pipe member includes a sealing pocket having an arcuate portion, a vertical portion, a base, and a recessed groove. The sealing ring is captured between the male pipe member and the female pipe member such that the sealing ring engages the sealing pocket at each of the arcuate portion, vertical portion, base, and recessed groove.

In another embodiment, prior to assembly, the sealing ring has a cross-sectional area characterized as a quadrilateral with a lower end and an upper end. In some embodiments, the lower end has two 90 degree corners with one of the 90 degree corners located adjacent to the recessed groove and the upper end has an obtuse angled corner and an acute angled corner with the acute angled corner adjacent to the arcuate portion of the sealing pocket. In other embodiments, the lower end has an obtuse angled corner and an acute angled corner with the acute angled corner adjacent to the recessed groove and the upper end has two 90 degree corners with one of the 90 degree corners adjacent to the arcuate portion of the sealing pocket. In additional embodiments, the lower end has a first obtuse angled corner and a first acute angled corner with the first acute angled corner adjacent to the recessed groove and the upper end has a second obtuse angled corner and a second acute angled corner with the second acute angled corner adjacent to the arcuate portion of the sealing pocket.

Another disclosed embodiment provides a method of assembling a hammer union. The method comprises the steps of: sliding a union nut over a male pipe member; positioning a sealing ring within a sealing pocket of a female pipe member, the sealing pocket having an arcuate portion, a vertical portion, a base, and a recessed groove; positioning the female pipe member adjacent to the male pipe member; securing the male pipe member to the female pipe member with the union nut; and deforming the sealing ring by generating an axial force against the union nut thereby forcing and capturing a portion of the sealing ring between the male pipe member and the female pipe member.

In some embodiments, deforming the sealing ring forces at least a portion of the sealing ring into the arcuate portion of the sealing pocket of the female pipe member. In other embodiments, deforming the sealing ring forces at least a portion of the sealing ring into the recessed groove of the sealing pocket of the female pipe member. In additional embodiments, deforming the sealing ring forces at least a portion of the sealing ring to engage the vertical portion of the sealing pocket of the female pipe member. In another embodiment, deforming the sealing ring forces at least a portion of the sealing ring into the arcuate portion of the sealing pocket, at least a portion of the sealing ring into the recessed groove of the sealing pocket, and at least a portion of the sealing ring to engage the vertical portion of the sealing pocket.

BRIEF DESCRIPTION OF THE DRAWINGS

The drawings included with this application illustrate certain aspects of the embodiments described herein. However, the drawings should not be viewed as exclusive embodiments.

FIG. 3 is a cross-sectional view of a hammer union prior to assembly showing the sealing ring in its manufactured state prior to assembly of the hammer union in accordance with one embodiment of the present disclosure.

FIG. 4B is an enlarged detail of the circled portion of FIG. 4A.

FIG. 5 is a cross-sectional view of a hammer union prior to assembly showing the sealing ring in its manufactured state prior to assembly of the hammer union in accordance with one embodiment of the present disclosure.

FIG. 6B is an enlarged detail of the circled portion of FIG. 6A.

DETAILED DESCRIPTION

Figure 1:
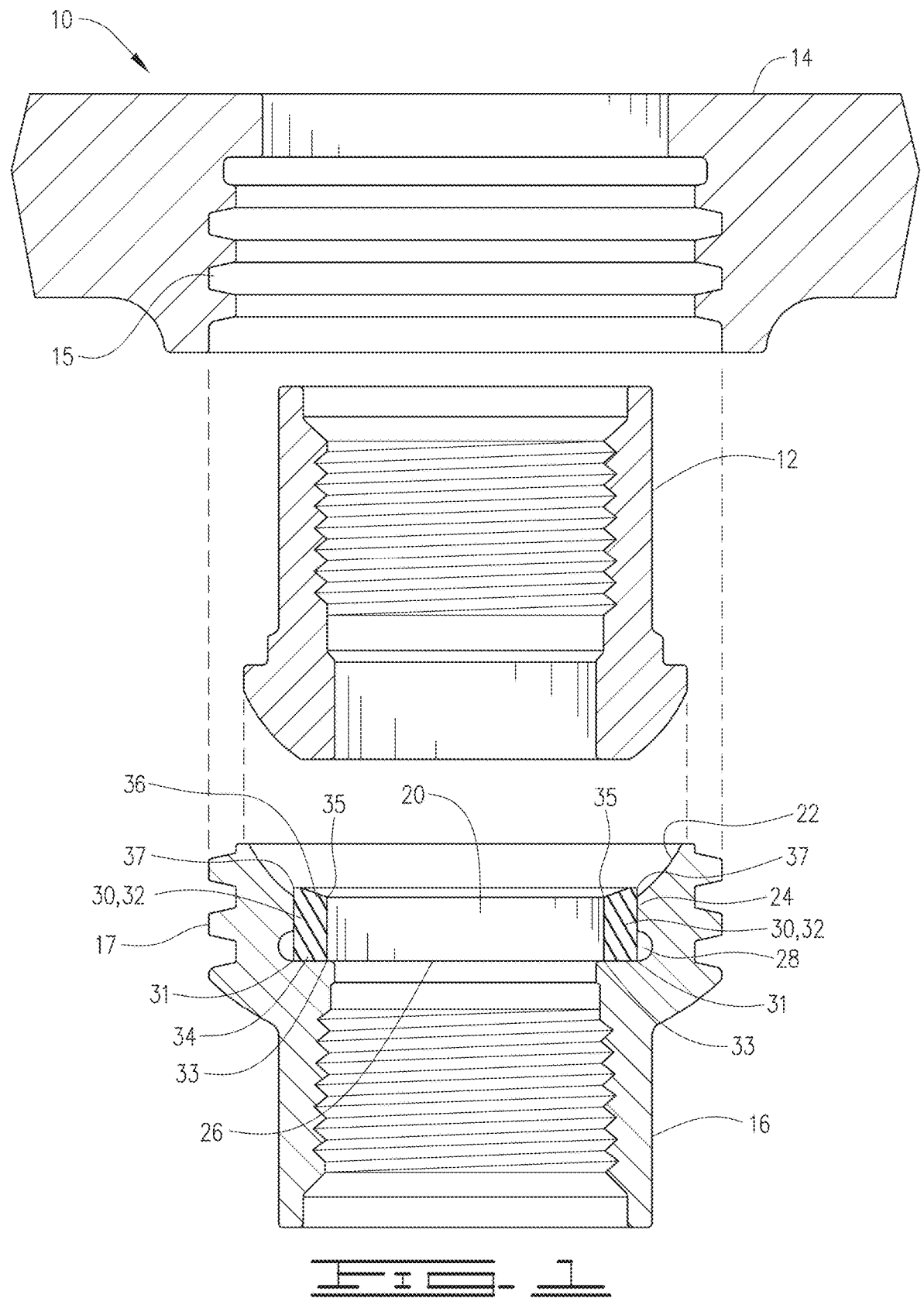
FIG. 1 is a cross-sectional view of a hammer union prior to assembly showing the sealing ring in its manufactured state prior to assembly of the hammer union in accordance with one embodiment of the present disclosure.

The present disclosure may be understood more readily by reference to these detailed descriptions. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Referring now to FIGS. 1-6 generally, the hammer union of the present disclosure is illustrated and generally designated by the numeral 10. FIGS. 1-6 illustrate the general components of a standard hammer union. The following disclosure, including the reference numerals of FIGS. 1-6, focuses on the improvements of hammer union 10 through use of the disclosed sealing ring 30. As shown by the drawings, the general form of hammer union 10 includes a male pipe member 12, a union nut 14, and a female pipe member 16. Union nut 14 includes thread portions 15 for engagement with female pipe member 16. Female pipe member 16 includes thread portions 17 for engagement with union nut 14 and a sealing pocket 20.

Sealing pocket 20 includes an arcuate portion 22, a vertical portion 24, a base 26, and a recessed groove 28. Positioned within female pipe member 16 is a sealing ring 30. Sealing ring 30 may rest on base 26 of sealing pocket 20 prior to assembly of hammer union 10. Sealing ring 30 is comprised of a material capable of deforming during assembly of hammer union 10. For example, sealing ring 30 may be comprised of a polymer such as an ultra high molecular weight polyethylene. In other embodiments, sealing ring 30 may be comprised of a polymer with a molecular weight of about 100,000 to about 250,000 monomer units per molecule.

Figure 2A:
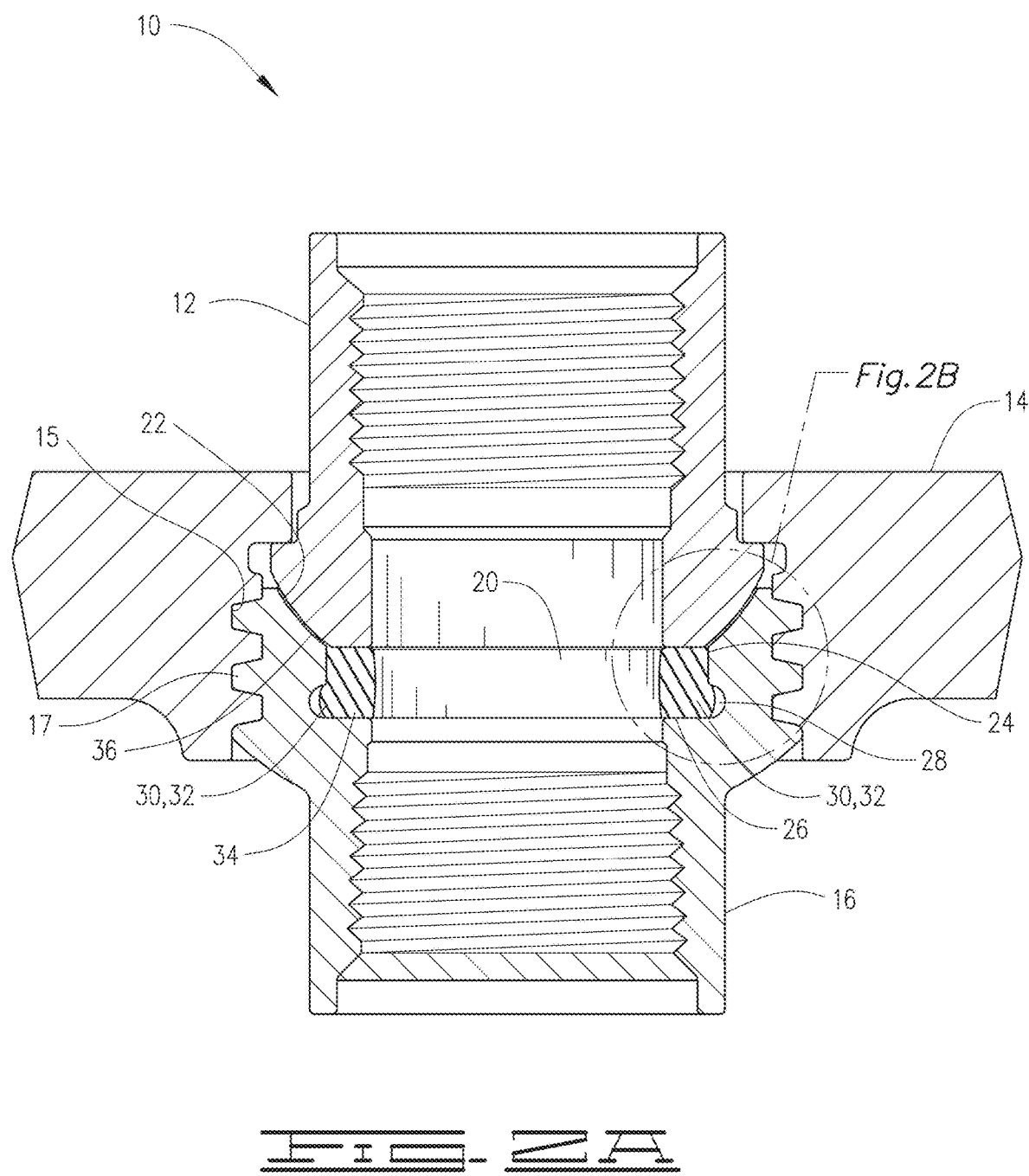
FIG. 2A is a cross-sectional view of the hammer union of FIG. 1 assembled in accordance with one embodiment of the present disclosure.
Figure 2B:
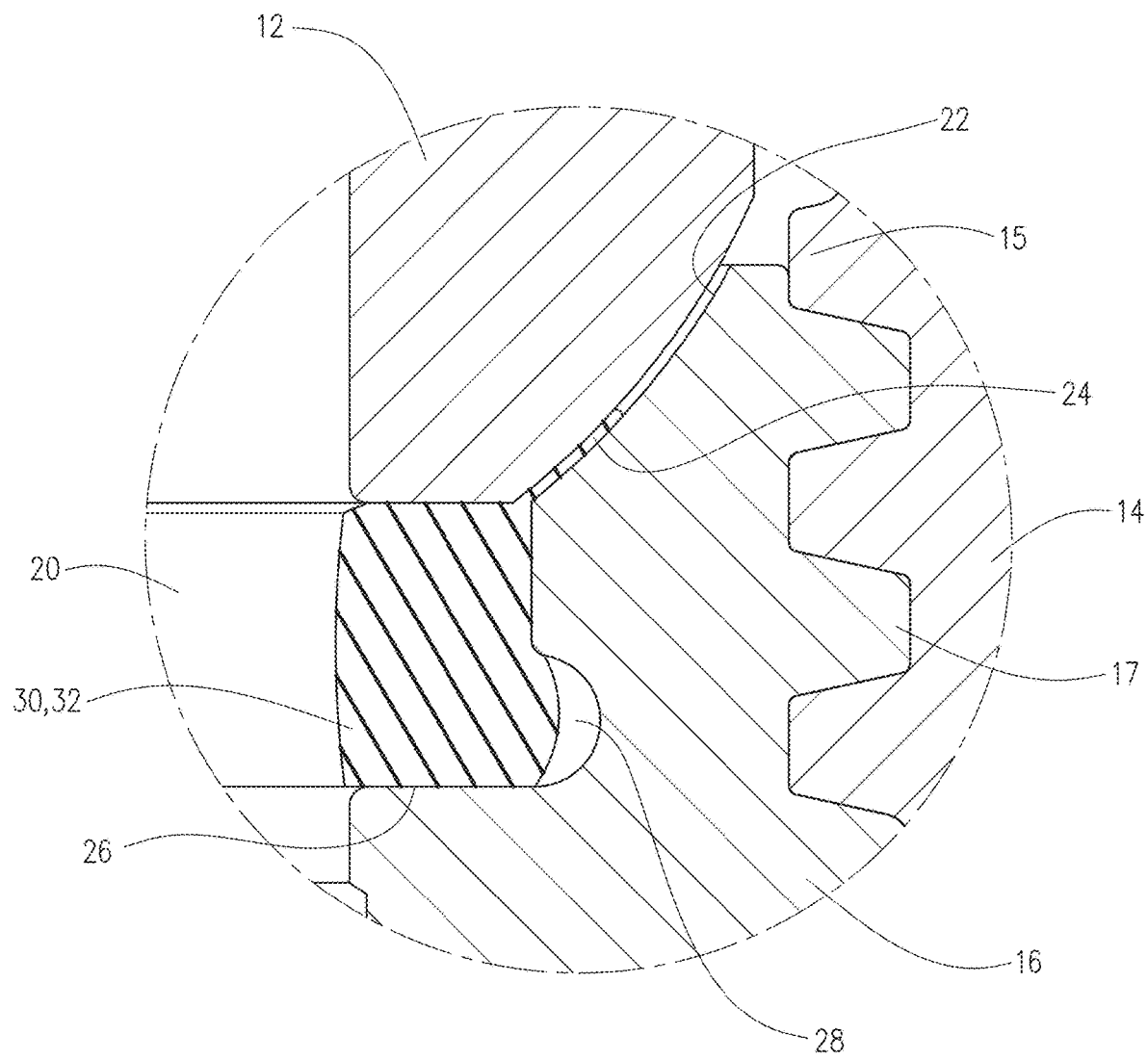
FIG. 2B is an enlarged detail of the circled portion of FIG. 2A.
Figure 4A:
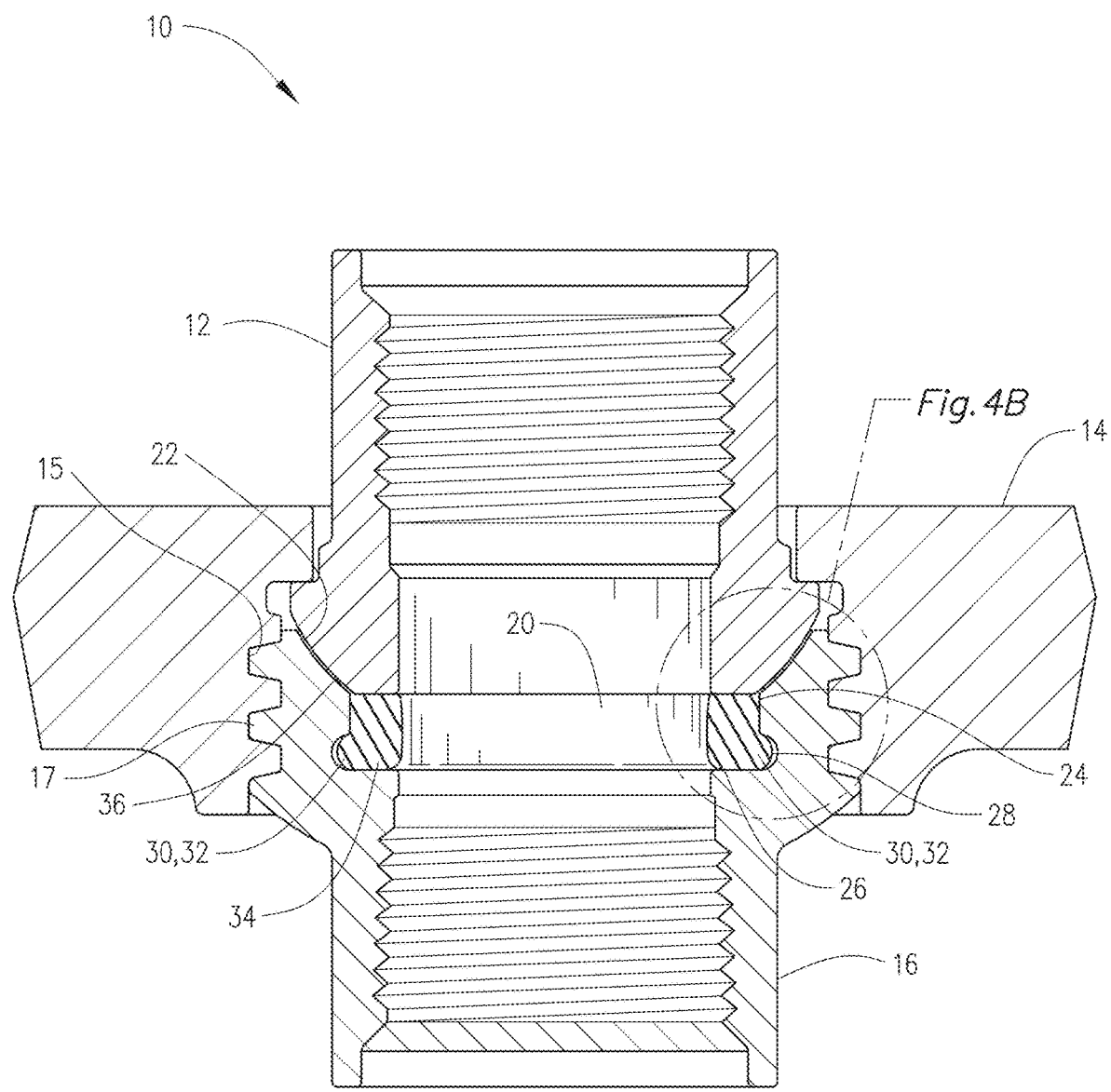
FIG. 4A is a cross-sectional view of the hammer union of FIG. 3 assembled in accordance with one embodiment of the present disclosure.
Figure 6A:
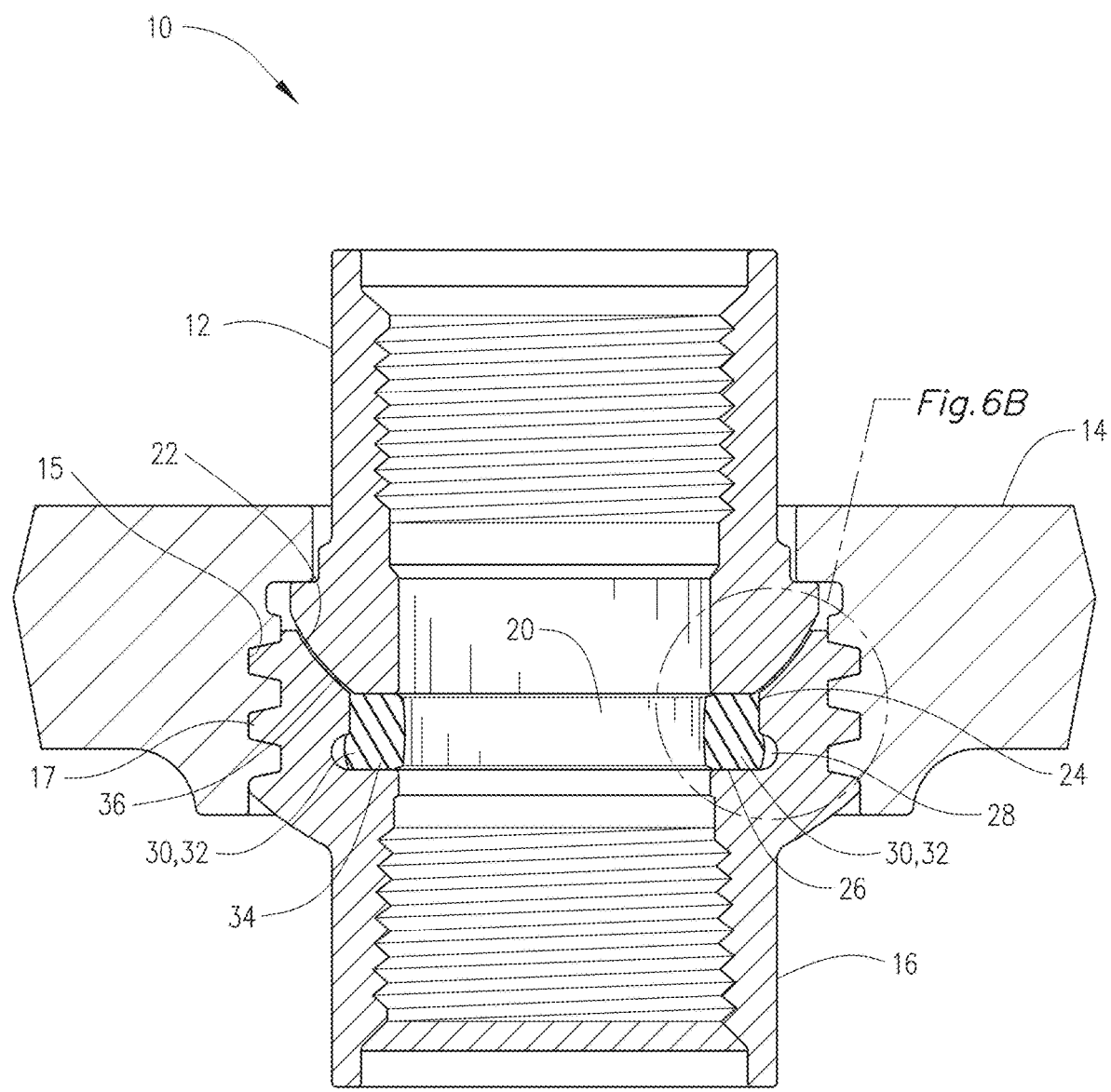
FIG. 6A is a cross-sectional view of the hammer union of FIG. 5 assembled in accordance with one embodiment of the present disclosure.
Figure 9B:
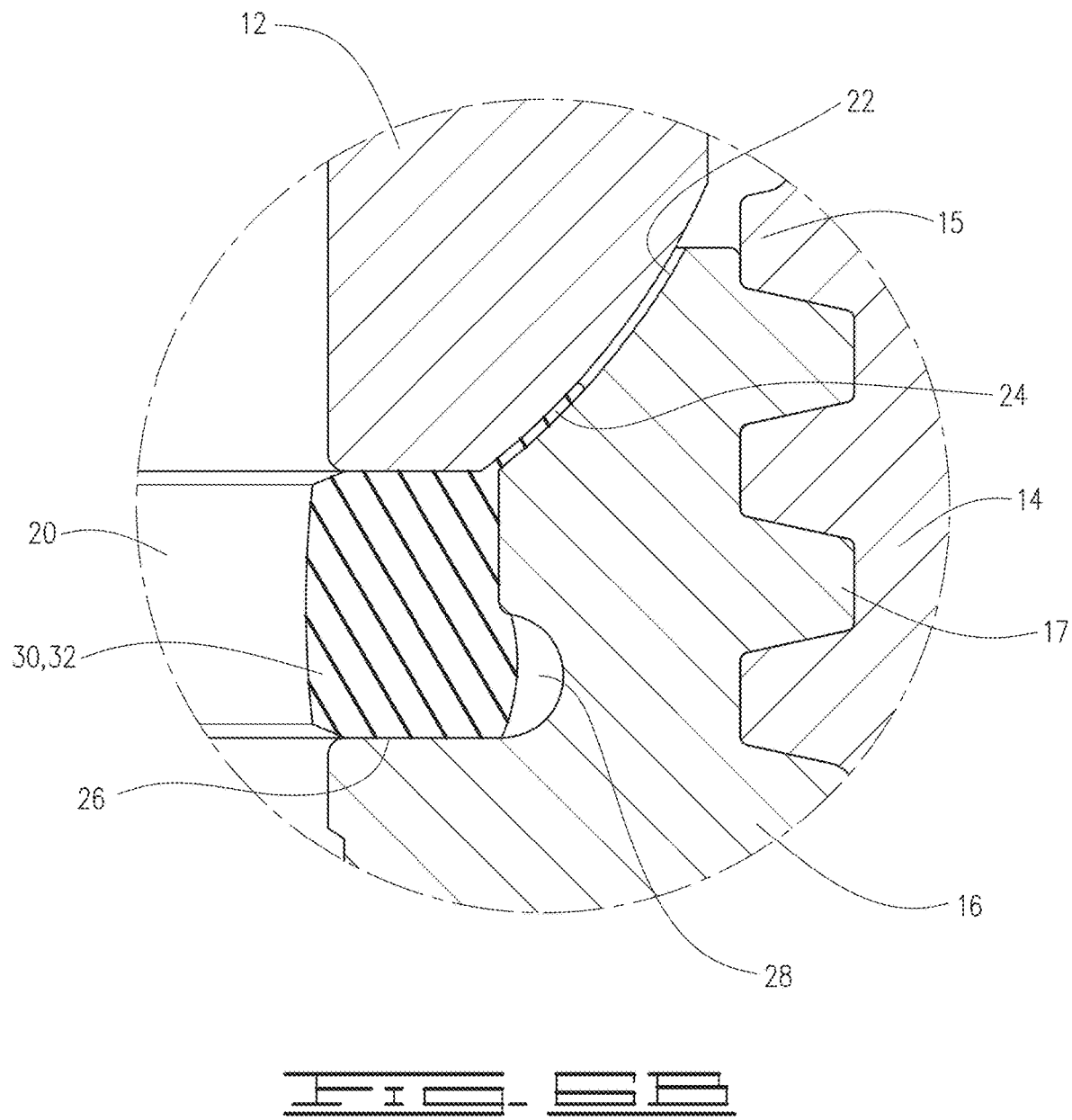

FIGS. 1, 3, and 5 depict sealing ring 30 in its manufactured state prior to assembly of hammer union 10. FIGS. 2A, 4A, and 6A depict hammer union 10 assembled. In order to better view sealing ring 30 in the deformed and captured state, FIGS. 2B, 4B, and 6B depict enlarged detail of the circled portions of FIGS. 2A, 4A, and 6A of the assembled hammer union 10. Deformation of sealing ring 30 results during the assembly of hammer union 10. As a result of the deformation, sealing ring 30 engages an increased surface area of sealing pocket 20 providing a more secure seal. The deformation of sealing ring 30 reduces and, in most instances, eliminates the likelihood of sealing ring displacement during fluid operations.

Sealing ring 30 has a cross-sectional area 32 characterized as a quadrilateral having a lower end 34 and an upper end 36. In some embodiments, as shown in FIGS. 1-2, sealing ring 30 includes two generally right angle corners 31, 33 at lower end 34 and an obtuse angled corner 35 and an acute angled corner 37 at upper end 36. Each right angle corner 31, 33 may have a radius of curvature as a transition from one side to the other. Prior to assembly of hammer union 10, acute angled corner 37 of upper end 36 is adjacent to arcuate portion 22 of sealing pocket 20. During assembly of hammer union 10, sealing ring 30 deforms such that acute angled corner 37 is captured between male pipe member 12 and female pipe member 16 in arcuate portion 22. The deformation of sealing ring 30 also forces the generally right angle corner of lower end 34 adjacent to vertical portion 24 into at least a portion of recessed groove 28. FIG. 1 shows sealing ring 30 in its manufactured state prior to assembly of hammer union 10. FIG. 2A, and FIG. 2B, showing the circled portion of FIG. 2A in enlarged detail, shows sealing ring 30 in the deformed state following assembly of hammer union 10.

In other embodiments, as shown in FIGS. 3-4, sealing ring 30 includes an obtuse angled corner 35 and an acute angled corner 37 at lower end 34 and two generally right angle corners 31, 33 at upper end 36. Each right angle corner 31, 33 may have a radius of curvature as the transition from one side to the other. Prior to the assembly of hammer union 10, acute angled corner 37 of lower end 34 is adjacent to recessed groove 28 of sealing pocket 20. During assembly, sealing ring 30 deforms such that acute angled corner 37 of lower end 34 is forced into at least a portion of recessed groove 28. The deformation of sealing ring 30 also captures generally right angle corner 31 of upper end 36 adjacent to arcuate portion 22 between male pipe member 12 and female pipe member 16 in arcuate portion 22. FIG. 3 shows sealing ring 30 in its manufactured state prior to assembly of hammer union 10. FIG. 4A, and FIG. 4B, showing the circled portion of FIG. 4A in enlarged detail, shows sealing ring 30 in the deformed state following assembly of hammer union 10.

In additional embodiments, as shown in FIGS. 5-6, sealing ring 30 includes an obtuse angled corner 35a and an acute angled corner 37a at lower end 34 and an obtuse angled corner 35b and an acute angled corner 37b at upper end 36. Prior to assembly of hammer union 10, acute angled corner 37a of lower end 34 is adjacent to recessed groove 28 and acute angled corner 37b of upper end 36 is adjacent to arcuate portion 22. During assembly, sealing ring 30 deforms such that acute angled corner 37a of lower end 34 is forced into at least a portion of recessed groove 28 when hammer union 10 is assembled. The deformation of sealing ring 30 also captures acute angled corner 35b of upper end 36 between male pipe member 12 and female pipe member 16 in arcuate portion 22. FIG. 5 shows sealing ring 30 in its manufactured state prior to assembly of hammer union 10. FIG. 6A, and FIG. 6B, showing the circled portion of FIG.

6A in enlarged detail, shows sealing ring 30 in the deformed state following assembly of hammer union 10.

A method of assembling hammer union 10 will now be described with reference generally to FIGS. 1-6. The initial assembly step requires sliding union nut 14 over male pipe member 12. Sealing ring 30 is positioned within sealing pocket 20 of female pipe member 16 such that sealing ring 30 is adjacent vertical portion 24 and rests on base 26. Female pipe member 16 is then positioned adjacent to male pipe member 12 such that thread portions 15 of union nut 14 can engage the thread portions 17 of female pipe member 16. Union nut 14 is then threaded onto female pipe member 16 such that male pipe member 12 is loosely secured to female pipe member 16. Once male pipe member 12 is loosely secured to female pipe member 16 with union nut 14, an axial force is generated against an edge of union nut 14 such that union nut 14 secures male pipe member 12 and female pipe member 16 with sealing ring 30 forced and captured between both components to form hammer union 10.

The step of securing male pipe member 12 to female pipe member 16 with union nut 14 deforms sealing ring 30 sufficiently to allow at least a portion of sealing ring 30 to be captured between male pipe member 12 and female pipe member 16. In some embodiments, deformation of sealing ring 30 forces at least a portion of sealing ring 30 into arcuate portion 22 of sealing pocket 20. In other embodiments, deformation of sealing ring 30 forces at least a portion of sealing ring 30 into recessed groove 28 of sealing pocket 20. In another alternative embodiment, deformation of sealing ring 30 ensures that at least a portion of sealing ring 30 engages vertical portion 24 of sealing pocket 20. Preferably, sealing ring 30 fully engages vertical portion 24 of sealing pocket 20. In some embodiments, deformation of sealing ring 30 forces at least a portion of sealing ring 30 into arcuate portion 22 and recessed groove 28 of sealing pocket 20 and sealing ring 30 also engages at least a portion of vertical portion 24 of sealing pocket 20. Preferably, sealing ring 30 fully engages vertical portion 24 of sealing pocket 20. Deformation and capture of sealing ring 30 creates an air and water tight seal between male pipe member 12 and female pipe member 16.

Therefore, the present disclosure is well adapted to attain the ends and advantages mentioned, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present disclosure. While apparatus and methods may be described in terms of "comprising," "containing," "having," or "including" various components or steps, the apparatus and methods can also, in some examples, "consist essentially of" or "consist of" the various components and steps. Also, the terms in the claims have their plain, ordinary meaning unless otherwise explicitly and clearly defined by the specification.

What is claimed is:

1. A hammer union comprising:
a male pipe member;
a union nut placed over the male pipe member,
a female pipe member, the female pipe member having a sealing pocket, wherein the sealing pocket includes a first portion, a vertical portion, a base, and a recessed groove; and
a sealing ring captured between the male pipe member and the female pipe member, wherein the sealing ring engages the sealing pocket of the female pipe member at each of the first portion, the vertical portion, the base, and the recessed groove, wherein prior to assembly the sealing ring has a cross-sectional area having a lower end and an upper end, wherein the lower end has a first angled lower corner, wherein the first angled lower corner is positioned adjacent to the recessed groove and the upper end has a first angled upper corner adjacent the first portion of the sealing pocket, wherein the first angled upper corner is an acute angled corner.

2. The hammer union of claim 1, wherein the first angled lower corner is a 90 degree corner.

3. The hammer union of claim 2, wherein the upper end has a second angled upper angled corner that is an obtuse corner, and the lower end has a second angled lower corner that is a 90 degree corner.

4. The hammer union of claim 1, wherein the sealing ring is comprised of a polymer.

5. The hammer union of claim 4, wherein the sealing ring is comprised of ultra high molecular weight polyethylene.

6. A method of assembling a hammer union comprising:
sliding a union nut over a male pipe member;
positioning a sealing ring within a sealing pocket of a female pipe member, the sealing pocket having a first portion, a vertical portion, a base, and a recessed groove;
positioning the female pipe member adjacent to the male pipe member;
securing the male pipe member to the female pipe member with the union nut; and
deforming the sealing ring by generating an axial force against the union nut thereby forcing at least a portion of the sealing ring into the first portion of the sealing pocket of the female pipe member such that a portion of the sealing ring is captured between the male pipe member and the female pipe member, wherein prior to assembly the sealing ring has a cross-sectional area having a lower end and an upper end, wherein the lower end has a first angled lower corner, wherein the first angled lower corner is positioned adjacent to the recessed groove and the upper end has a first angled upper corner adjacent the first portion of the sealing pocket.

7. The method of claim 6, wherein deforming the sealing ring forces at least a portion of the sealing ring into the recessed groove of the sealing pocket of the female pipe member.

8. The method of claim 6, wherein deforming the sealing ring forces at least a portion of the sealing ring to engage the vertical portion of the sealing pocket of the female pipe member.

9. The method of claim 6, wherein deforming the sealing ring forces at least a portion of the sealing ring into the first portion of the sealing pocket, at least a portion of the sealing ring into the recessed groove of the sealing pocket, and at least a portion of the sealing ring to engage the vertical portion of the sealing pocket.

10. The method of claim 6, wherein the first angled upper corner is an acute angled corner.

11. The method of claim 10, wherein the first angled lower corner is a 90 degree corner.

12. The method of claim 11, wherein the upper end has a second angled upper angled corner that is an obtuse corner, and the lower end has a second angled lower corner that is a 90 degree corner.

13. The method of claim 6, wherein the first lower angled corner is an acute angled corner and the upper end having two 90 degree corners with one of the 90 degree corners adjacent to the first portion of the sealing pocket.

14. The method of claim 6, wherein the first lower angled corner is acute angled corner and the first angled upper corner is an acute angled corner and the upper end has a second angled upper corner that is an obtuse angled corner.

15. The method of claim 14, wherein the sealing ring is comprised of a polymer.

16. A hammer union, comprising:
a male pipe member;
a union nut placed over the male pipe member,
a female pipe member, the female pipe member having a sealing pocket, wherein the sealing pocket includes a first portion, a vertical portion, a base, and a recessed groove; and
a sealing ring captured between the male pipe member and the female pipe member, wherein the sealing ring engages the sealing pocket of the female pipe member at each of the first portion, the vertical portion, the base, and the recessed groove, wherein prior to assembly the sealing ring has a cross-sectional area having a lower end and an upper end, wherein the lower end has a first angled lower corner, wherein the first angled lower corner is positioned adjacent to the recessed groove and the upper end has a first angled upper corner adjacent the first portion of the sealing pocket, wherein the first lower angled corner is an acute angled corner and the upper end having a second obtuse angled corner and a second acute angled corner with the second acute angled corner adjacent to the first portion of the sealing pocket.

17. The hammer union of claim 16, wherein the first angled upper corner is a 90 degree corner.

18. The hammer union of claim 16, wherein the angled upper corner is an acute corner.

* * * * *